Figure 1:
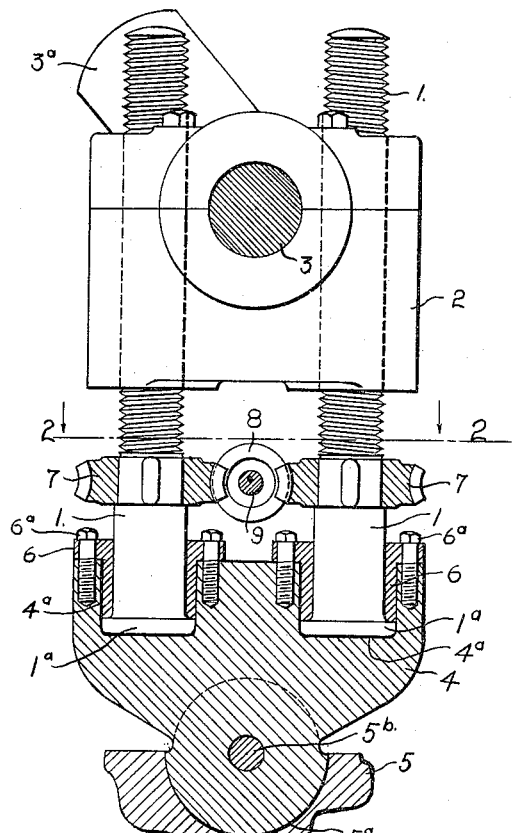

W. H. WELCH.
ADJUSTABLE CONNECTION FOR STAMPING PRESSES.
APPLICATION FILED JUNE 29, 1914.

1,148,641.

Patented Aug. 3, 1915.

Witnesses
H. A. Schwartz
F. C. Adams

Inventor
Wm. H. WELCH.

By Obed S. Billman
Attorney

UNITED STATES PATENT OFFICE.

WILLIAM H. WELCH, OF CLEVELAND, OHIO, ASSIGNOR TO THE CLEVELAND MACHINE & MFG. COMPANY, OF CLEVELAND, OHIO, A CORPORATION OF OHIO.

ADJUSTABLE CONNECTION FOR STAMPING-PRESSES.

1,148,641.  Specification of Letters Patent.  Patented Aug. 3, 1915.

Application filed June 29, 1914. Serial No. 848,030.

*To all whom it may concern:*

Be it known that I, WILLIAM H. WELCH, a citizen of the United States, residing at Cleveland, in the county of Cuyahoga and State of Ohio, have invented certain new and useful Improvements in Adjustable Connections for Stamping-Presses, of which the following is a specification.

My invention relates to improvements in adjustable connections for stamping presses, the primary object of the invention being to provide a generally improved adjustable connection for power stamping presses whereby a quick adjustment is facilitated between the actuating crank and the main cross head or slide and the general strength and stability of the connecting parts greatly increased.

A still further object is to provide an adjustable connection having improved connecting bearings at each end and which by reason of such construction and the general arrangement and combination of parts, hereinafter more fully referred to, enable the same to be given greater range of adjustments between the crank shaft and the cross head or slide thereby greatly increasing the usefulness of the press as a whole by simplifying the construction of the base and eliminating the use of stationary filler blocks for building up the base carrying the fixed dies as now frequently resorted to in power presses having the ordinary single threaded connecting rod the latter having a limited length of adjustment. In such commonly employed single screw threaded connecting rod, as is well known to those skilled in the art to which this invention relates, when the same is lengthened extensively such connection rod is liable to buckle, or in other words,—the central unsupported portion thereof frequently bows out laterally to the front or rear when the cross head or die carrying block strikes the article to be stamped, this being particularly manifest in large heavy stampings, the great friction and side thrust on the crank at this moment also aiding or accelerating such bowing or buckling of the single adjusting rod connection above referred to.

By the use of my improved adjustable connection the above mentioned objection or liability is obviated or eliminated by the provision of two adjustable connecting rods threaded in the crank bearing or block carried by the crank pin or eccentric of the crank or driving shaft, the lower ends of the adjustable connecting rods being mounted in a bearing head at opposite sides of the pivoted connection of said bearing head with the cross head or slide and in line with the motion of the actuating crank. Suitable actuating mechanism is also provided for simultaneously operating or revolving the adjustable connecting rods whereby the latter may be adjusted.

With the above mentioned and other ends in view, the invention consists in the novel construction, arrangement, and combination of parts, hereinafter described, illustrated in one of its embodiments in the accompanying drawings, and particularly pointed out in the appended claims.

Figure 2:
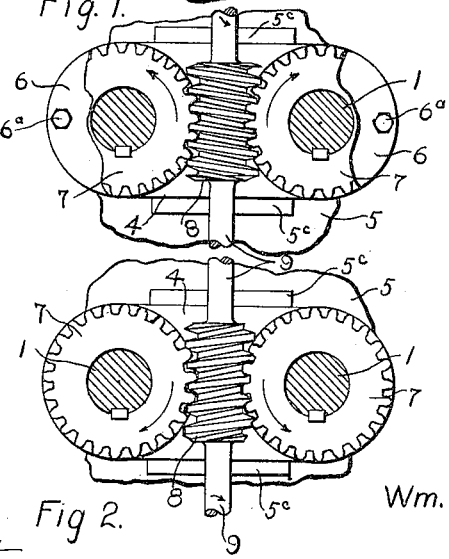

Referring to the drawings, forming a part of this specification, Figure 1, is a side elevation, partly in section, of an adjustable connection constructed in accordance with my invention. Fig. 2, a horizontal cross sectional view taken on line 2—2 of Fig. 1.

Similar numerals of reference designate like parts throughout all the figures of the drawings.

For the purposes hereinbefore mentioned and explained, I provide two adjustable connecting rods 1, threaded in a crank bearing or block 2, carried by a crank pin or eccentric 3, of a crank or driving shaft 3ª. The parts 2, 3, and 3ª, may be of any suitable and convenient construction as likewise the cross head or slide 5, to which the lower ends of the adjusting screws or rods 1, are pivotally attached by the means hereinafter described.

The lower ends of the screw threaded adjusting rods or members 1, are mounted in a bearing head 4, which latter may be pivotally mounted and secured to the cross head or slide 5, in the usual manner, as for example,—by means of a segmental bearing portion seated within a socket 5ª, and connected to the cross slide by means of a pivot bearing 5ᵇ, mounted in suitable lugs 5ᶜ.

As a convenient means of mounting and connecting the lower ends of the adjustable connecting rods 1, to the bearing head 4, at opposite sides of the pivot bearing portion 5$^b$, thereof and in a plane parallel with the motion of the crank 3, above, the lower ends of said rods are provided with enlarged or flanged bearing heads 1$^a$, seated in sockets 4$^a$, and retained therein by means of flanged bearing sleeves or caps 6, which latter may be secured by means of cap screws 6$^a$.

As a means of simultaneously operating or revolving the threaded connecting or adjusting rods 1, the latter are provided with worm gears 7, meshing at their inner sides with a transversely extending worm 8, on a worm shaft 9, which latter may be mounted in any suitable and convenient manner and may be extended to one side and operated by hand, if a small press, or if a large press, by suitable power driven gearing whereby the connecting rods are simultaneously actuated for adjusting the length of the adjustable connection as a whole in accordance with the thickness of the material to be operated upon as well as the dimensions of the dies, etc., carried by the cross head or slide and the fixed or coöperating dies below.

If the improved adjustable connection is used in a large press or in connection with a cross head or slide of wide dimensions the worm shaft 9, is extended and provided with a second worm meshing with a second pair of worm gears carried by a second pair of connecting rods similarly mounted and connected as shown most clearly in Fig. 2 of the drawings. In such instance the worm gears 7, and worms 8, are arranged in opposite relation to each other and travel in the direction indicated by the arrows thereby relieving the worm shaft, 9, of any substantial end thrust, the resistance offered to the worms 8, by the two pairs of worm gears being such as to substantially balance the shaft as respects such end thrust.

From the foregoing description, taken in connection with the accompanying drawings, the operation and advantages of my invention will be readily understood.

Having thus described one of the embodiments of my invention, what I claim and desire to secure by Letters Patent, is,—

1. In an adjustable connection, a crank, a slide, bearing members therefor, a pair of threaded connecting rods mounted in and carried by said bearing members in a plane parallel with the plane of motion of said crank, and means for simultaneously rotating said connecting rods.

2. In an adjustable connection for stamping presses, the combination with a crank bearing, and a pivoted bearing head; of oppositely arranged simultaneously adjustable connecting rods carried thereby in a plane parallel with the plane of movement imparted to said bearing members.

3. In an adjustable connection, the combination with a crank, a slide, and bearing members carried thereby; of oppositely disposed simultaneously adjustable connecting rods carried by said bearing members in a plane parallel with the plane of motion imparted to the latter.

4. An adjustable connection for stamping presses, comprising a crank, a pivoted bearing head carried thereby, a pair of threaded connecting rods carried by said bearing head, a bearing head connected to said connecting rods and means for simultaneously rotating said connecting rods.

5. An adjustable connection between a crank and a slide, comprising a crank bearing member, a bearing member adapted to be pivoted to said slide, threaded connecting rods extending on opposite sides of said crank between said bearing members, and worm and worm drive mechanism for simultaneously rotating said threaded connecting rods.

6. An adjustable connection between a crank and a slide, comprising a crank bearing block, a movable bearing head adapted to be connected to said slide and adapted to oscillate in a plane parallel to the plane of movement of said crank, adjustable connecting rods carried by said crank bearing block and said movable bearing head and movable in the plane of oscillation of the latter, and means for simultaneously adjusting said adjustable connecting rods.

7. An adjustable connection between a crank and a slide, comprising a crank bearing block, a pair of threaded connecting rods mounted therein, a bearing head adapted to be pivotally connected to said slide and connected to the lower ends of said threaded connecting rods, worm gears carried by the latter, and a worm shaft provided with a worm interposed between and meshing with said worm gears.

8. In an adjustable connection, a crank bearing, a pivoted slide bearing, and two simultaneously adjustable connecting rods mounted in said bearings at a distance front and back of the center lines thereof.

9. An adjustable connection between a crank and a slide, comprising a crank bearing member and a movable slide bearing member, and two adjusting screws mounted therein front and back of a line from the center of the pivoted connection of said crank bearing member to the center of the pivoted connection of said slide bearing member.

10. In an adjustable connection between a crank and a slide, the combination with a crank and a crank bearing member; of two adjusting screws mounted in said bearing member on opposite sides of the connection between said crank and said crank bearing member, worm gears carried by said screws, and a worm interposed between said worm gears whereby said actuating screws are simultaneously rotated.

In testimony whereof I have affixed my signature in presence of two witnesses.

WILLIAM H. WELCH.

Witnesses:
J. W. HAYWARD,
O. C. BILLMAN.

Copies of this patent may be obtained for five cents each, by addressing the "Commissioner of Patents, Washington, D. C."